United States Patent
Grant et al.

(10) Patent No.: US 9,833,697 B2
(45) Date of Patent: Dec. 5, 2017

(54) HAPTIC SENSATIONS AS A FUNCTION OF EYE GAZE

(71) Applicant: IMMERSION CORPORATION, San Jose, CA (US)

(72) Inventors: Danny A. Grant, Laval (CA); Vincent Levesque, Montreal (CA)

(73) Assignee: Immersion Corporation, San Jose, CA (US)

(*) Notice: Subject to any disclaimer, the term of this patent is extended or adjusted under 35 U.S.C. 154(b) by 146 days.

(21) Appl. No.: 13/793,966

(22) Filed: Mar. 11, 2013

(65) Prior Publication Data

US 2014/0256438 A1 Sep. 11, 2014

(51) Int. Cl.
*A63F 13/40* (2014.01)
*G06F 3/01* (2006.01)

(52) U.S. Cl.
CPC .............. *A63F 13/10* (2013.01); *G06F 3/013* (2013.01); *G06F 3/016* (2013.01)

(58) Field of Classification Search
CPC ... G09B 5/02; G09B 5/06; G09G 5/08; G09G 5/02; G09G 5/373; H03K 2217/96062; G06F 3/015; G06F 3/013
See application file for complete search history.

(56) References Cited

U.S. PATENT DOCUMENTS

| 6,088,017 A * | 7/2000 | Tremblay ................ G06F 3/011 345/156 |
| 2004/0178890 A1* | 9/2004 | Williams ................. B60Q 9/00 340/425.5 |
| 2008/0055248 A1 | 3/2008 | Tremblay et al. |
| 2008/0169914 A1* | 7/2008 | Albertson ............. B60W 40/09 340/438 |

(Continued)

FOREIGN PATENT DOCUMENTS

| CN | 101809525 A | 8/2010 |
| CN | 101998081 A1 | 3/2011 |

(Continued)

OTHER PUBLICATIONS

Chen, B., Samsung's New Smartphone Will Track Eyes to Scroll Pages [online], The New York Times Bits, Mar. 4, 2013 [retrieved on Mar. 10, 2013]. Retrieved from the Internet <URL: http://bits.blogs.nytimes.com/2013/03/04/samsungs-new-smartphone-will-track-eyes-to-scroll-pages/?pagewanted=print>.

(Continued)

*Primary Examiner* — James S McClellan
*Assistant Examiner* — Kevin Carter
(74) *Attorney, Agent, or Firm* — Kilpatrick Townsend & Stockton LLP

(57) ABSTRACT

Systems, electronic devices, and methods provide haptic sensations as a function of eye gaze. A system may include a detector configured to determine a direction of an eye gaze (Continued)

of a user of the system, a processor configured to generate signal representative of a haptic effect based on the direction of the eye gaze, and a haptic output device configured to receive the signal from the processor and output the haptic effect to the user. A method for providing a haptic effect to a user of a system may include determining a direction of an eye gaze of the user of the system, generating a haptic effect based on the direction of the eye gaze, and outputting the haptic effect to the user.

25 Claims, 8 Drawing Sheets

(56) References Cited

U.S. PATENT DOCUMENTS

| | | | |
|---|---|---|---|
| 2009/0088659 A1* | 4/2009 | Graham | G06F 3/016 600/545 |
| 2010/0033333 A1* | 2/2010 | Victor | A61B 3/113 340/576 |
| 2011/0227824 A1* | 9/2011 | Zhou et al. | 345/157 |
| 2013/0300759 A1* | 11/2013 | White | G06F 3/011 345/589 |

FOREIGN PATENT DOCUMENTS

| | | | | |
|---|---|---|---|---|
| CN | 102246119 A | 11/2011 | | |
| CN | H-2011-249773 | 12/2011 | | |
| JP | H-10153946 A | 6/1998 | | |
| JP | H-2005-282279 | 10/2005 | | |
| JP | H-2008-69449 | 3/2008 | | |
| JP | 2012-120798 A | 6/2012 | | |
| NL | WO 2006100645 A2 * | 9/2006 | ............ | G06F 3/013 |
| WO | 2006/100645 A2 | 9/2006 | | |
| WO | WO 2006100645 A2 * | 9/2006 | ............... | G06F 3/01 |
| WO | 2010/067221 A1 | 6/2010 | | |
| WO | 2013/018267 A1 | 2/2013 | | |
| WO | 2012/132495 A1 | 7/2014 | | |

OTHER PUBLICATIONS

Chinese Patent Office Application No. 201410086638.1, Office Action dated Mar. 20, 2017.
Chinese Patent Office Application No. 201410086638.1 Office Action dated Jul. 20, 2016.
European Patent Office Application No. 14158952.3, Extended European Search Report dated Jul. 28, 2016.
State Intellectual Property Office of the Peoples Republic of China application No. 201410086638.1, Third Office Action with translation dated Sep. 20, 2017, 24 pages.
Japanese Patent Office Application No. 2014-030614, Office Action with translation dated Oct. 17, 2017, 8 pages.

* cited by examiner

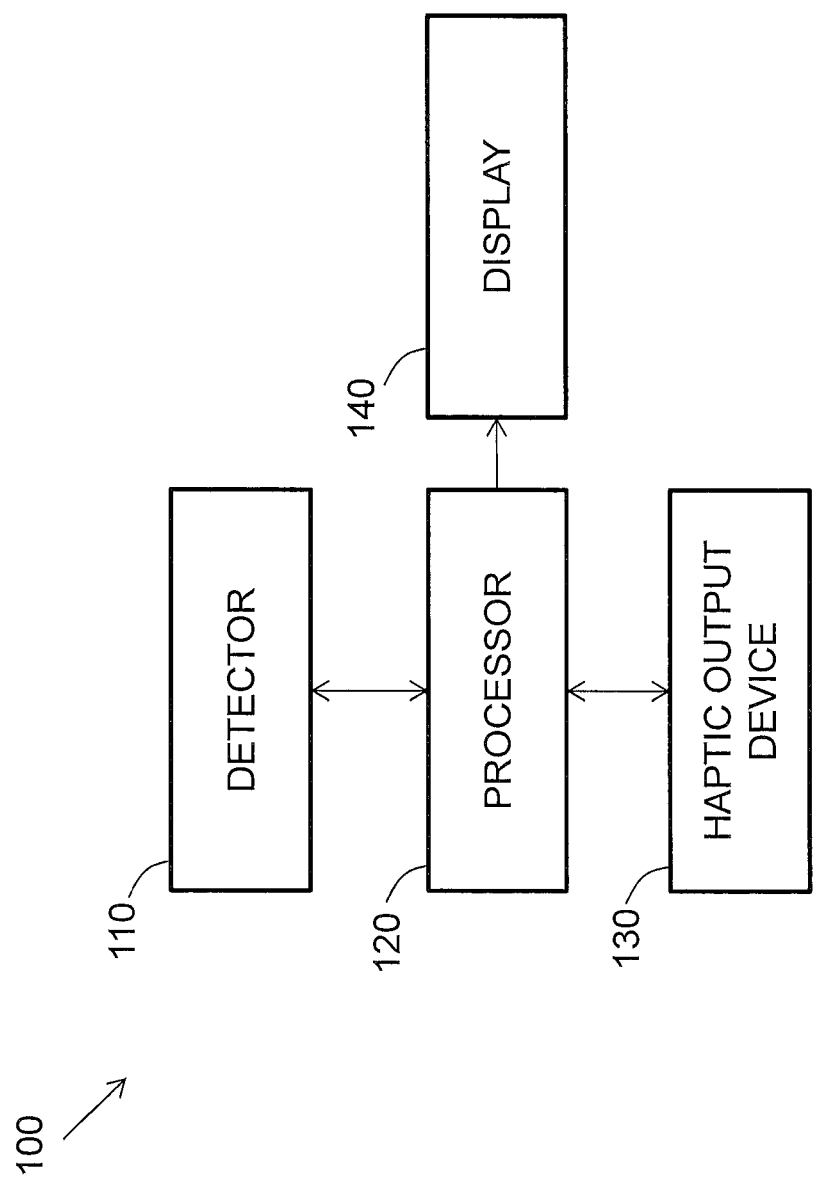

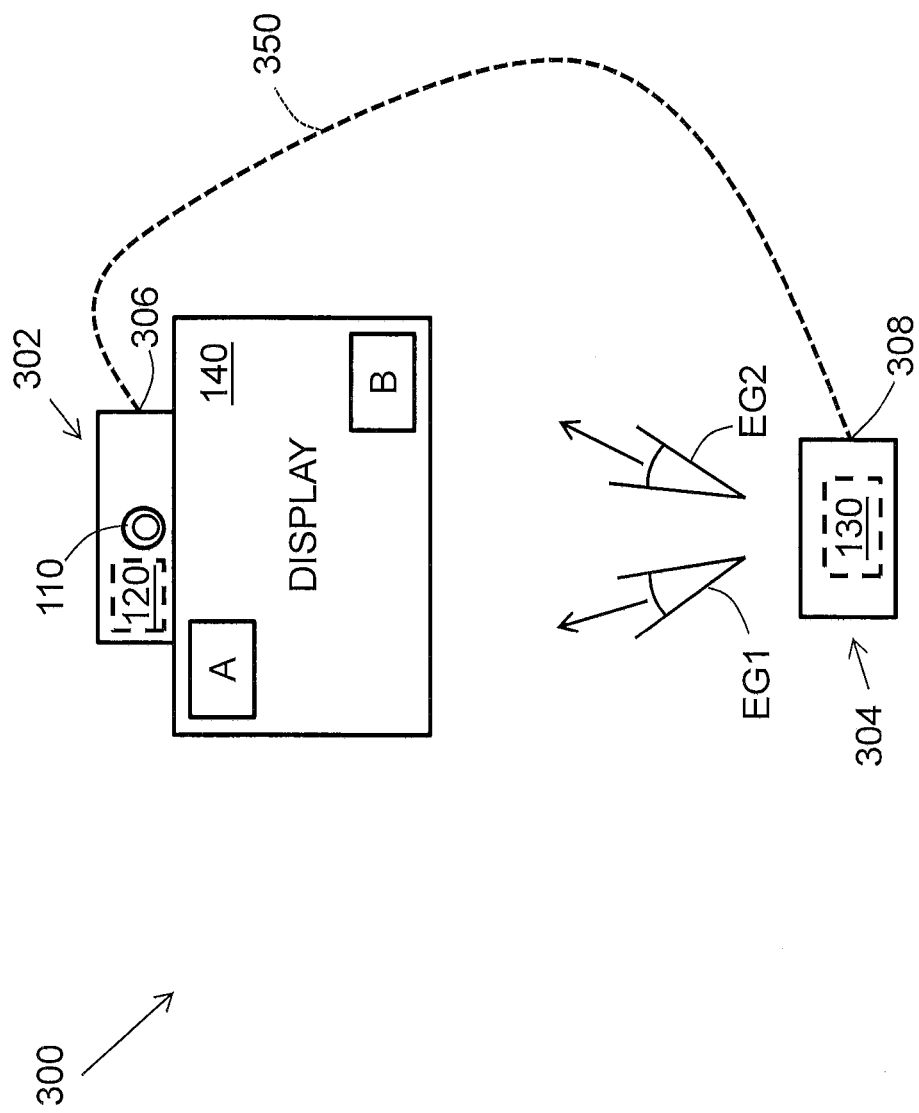

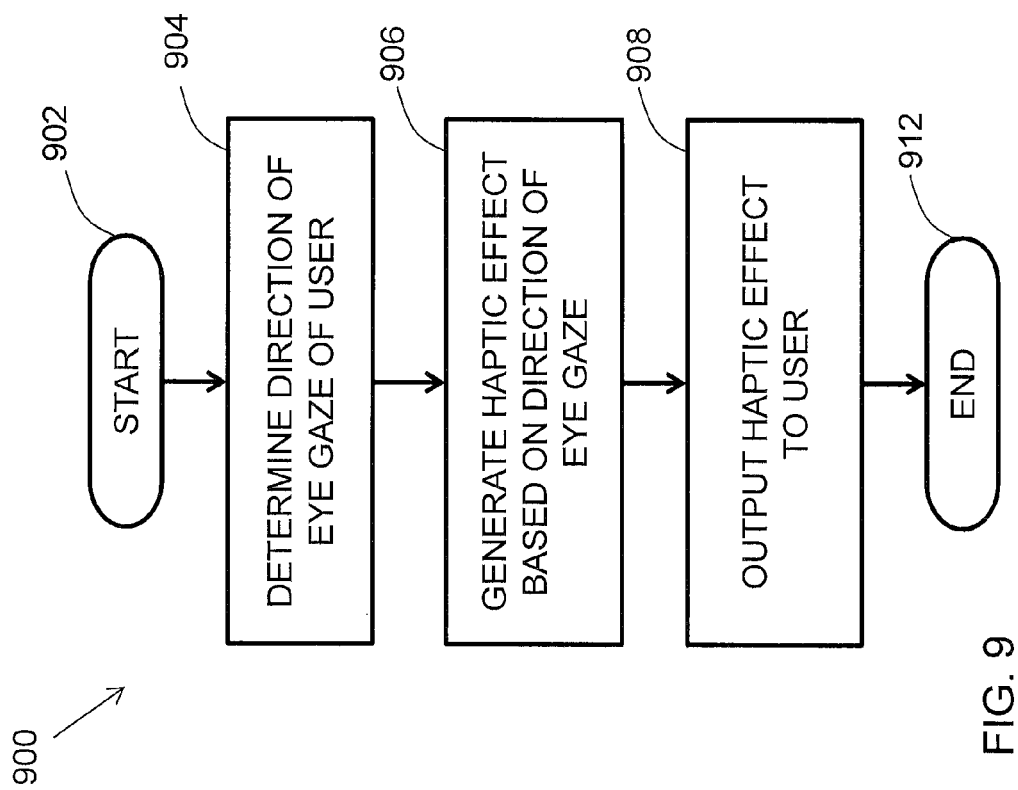

HAPTIC SENSATIONS AS A FUNCTION OF EYE GAZE

FIELD

The present invention is related to systems, electronic devices, and methods for providing haptic sensations as a function of eye gaze.

BACKGROUND

Detection methods in order to determine a direction of an eye gaze of a user of an electronic device are becoming more prevalent in human computer interactions. Eye gaze detection, for example, may be used to better determine where a user is pointing at a display when using the Microsoft's KINECT® Gaming System or Sony's PLAYSTATION EYE® camera for use with a computer game console. In general, the user's eye gaze may be used as an input to the computer device. For example, the current focus of the user interface may be directed to where the user is looking, similar to the use of a mouse as a pointer on a computer screen. As systems like the KINECT® get more sophisticated, eye gaze detection may become a standard means of providing input to software applications.

SUMMARY

It is desirable to use eye gaze direction information as an input to create haptic effects in an electronic device so that the haptic effects may be better matched to the user's overall experience according to what the user is currently looking at. This may provide a more immersive experience to the user.

According to an aspect of the present invention, there is provided a system that includes a detector configured to determine a direction of an eye gaze of a user of the system, a processor configured to generate signal representative of a haptic effect based on the direction of the eye gaze, and a haptic output device configured to receive the signal from the processor and output the haptic effect to the user.

According to an aspect of the present invention, there is provided a method for providing a haptic effect to a user of a system. The method includes determining a direction of an eye gaze of the user of the system, generating a haptic effect based on the direction of the eye gaze, and outputting the haptic effect to the user.

According to an aspect of the present invention, there is provided an electronic device that includes a housing, a detector supported by the housing, the detector configured to determine a direction of an eye gaze of a user of the electronic device, a haptic output device supported by the housing, the haptic output device configured to generate a haptic effect to the user, and a processor supported by the housing. The processor is configured to generate a first haptic drive signal representative of a first haptic effect based on the eye gaze of the user corresponding to the user looking at the electronic device, and a second haptic drive signal representative of a second haptic effect based on the eye gaze of the user corresponding to the user looking away from the electronic device. The processor is configured to output the first haptic drive signal or the second haptic drive signal to the haptic output device to generate the haptic effect based on the direction of the eye gaze determined by the detector.

BRIEF DESCRIPTION OF THE DRAWINGS

The components of the following Figures are illustrated to emphasize the general principles of the present disclosure and are not necessarily drawn to scale. Reference characters designating corresponding components are repeated as necessary throughout the Figures for the sake of consistency and clarity.

FIG. 1 is a schematic illustration of a system for providing haptic sensations to a user of the system as a function of eye gaze of the user in accordance with an embodiment of the invention;

FIG. 3 is a schematic illustration of an embodiment of the system of FIG. 1;

FIG. 9 is a flow diagram of a method for providing haptic sensations to a user of the system of FIG. 1 or the electronic device of FIG. 4 as a function of eye gaze of the user in accordance with an embodiment of the invention.

DETAILED DESCRIPTION

Figure 2:
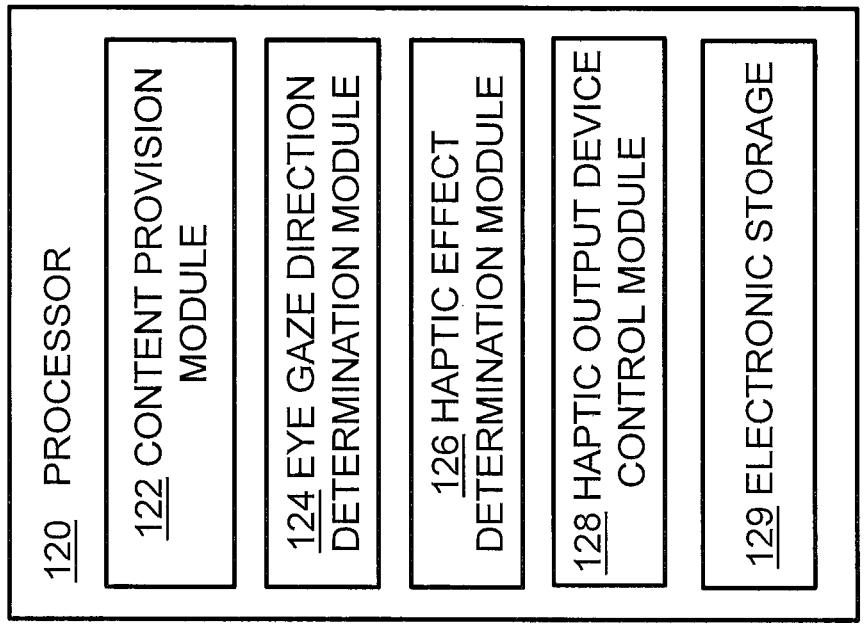
FIG. 2 is a schematic illustration of an embodiment of a processor of the system of FIG. 1.

FIG. 1 illustrates a system 100 in accordance with an embodiment of the invention. As illustrated, the system 100 includes a detector 110, a processor 120, a haptic output device 130, and a display 140. The detector 110 is configured to determine a direction of an eye gaze of a user of the system 100, the processor 120 is configured to generate a signal representative of a haptic effect based on the direction of the eye gaze, the haptic output device 130 is configured to receive the signal from the processor and output the haptic effect to the user, and the display 140 is configured to display content to the user.

Figure 1A:
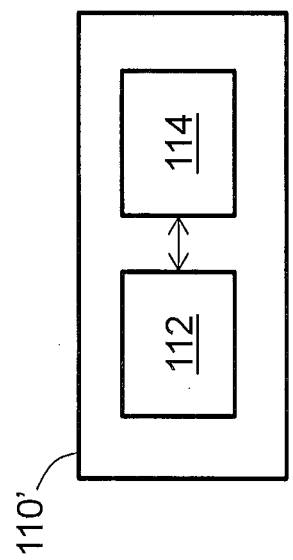
FIG. 1A is a schematic illustration of an embodiment of a detector of the system of FIG. 1.
Figure 1B:
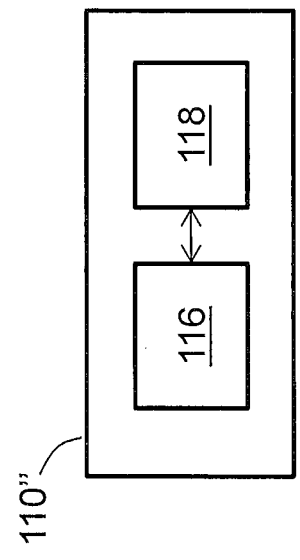
FIG. 1B is a schematic illustration of an embodiment of a detector of the system of FIG. 1.

The detector 110 may include any detection means that are used to detect eye gaze. For example, FIG. 1A illustrates an embodiment of a detector 110' that may include a camera 112 configured to capture an image of an eye of the user of the system 100, and a processor 114 configured to determine the direction of the eye gaze based on the image. In an embodiment, the processor 114 may be part of the processor 120 of FIG. 1. Image processing techniques to determine eye gaze direction and are well known in the literature and therefore are not described herein. FIG. 1B illustrates an embodiment of a detector 110" that may include a sensor 116 configured to monitor movements of muscles near the eye of the user, and a processor 118 configured to determine the direction of the eye gaze based on the monitored movement. In an embodiment, the sensor 116 may be configured to measure electrical activity of the muscles moving the eyes. In an embodiment, the processor 118 may be part of the processor 120 of FIG. 1.

The illustrated embodiments of the detector are not considered to be limiting in any way and other detection means that provide for the determination of a direction of the user's eye gaze may be used in accordance with embodiments of the present invention. For example, in an embodiment, the user's eye gaze direction may be estimated by analyzing the user's body or head posture.

In an embodiment, the detector 110 may also be configured to determine where the user's current eye gaze direction is focused. This may be accomplished by using image processing techniques to determine the position and the shape of the iris of a user's eye, in combination with a model or stored reference image of the iris. In an embodiment, the user's eye gaze direction may be stored as pitch and yaw angles for each eye. With this information, the depth of field of the user's current gaze may also be determined. In an embodiment, other sensors may be used in addition to the detector 110 to better determine the user's intent or volition, such as sensors that are typically associated with functional magnetic resonance imaging ("fMRI") or electroencephalogram ("EEG"). Haptic effects may be rendered as a function of these combined sensor and detector outputs.

FIG. 2 illustrates an embodiment of the processor 120 in more detail. The processor 120 may be configured to execute one or more computer program modules. The one or more computer program modules may include one or more of a content provision module 122, an eye gaze determination module 124, a haptic effect determination module 126, a haptic output device control module 128, and/or other modules. The processor 120 may be configured to execute the modules 122, 124, 126, and/or 128 by software, hardware, firmware, some combination of software, hardware, and/or firmware, and/or other mechanisms for configuring processing capabilities on processor 120.

It should be appreciated that although modules 122, 124, 126, and 128 are illustrated in FIG. 3 as being co-located within a single processing unit, in embodiments in which the processor 120 includes multiple processing units, one or more of modules 122, 124, 126, and/or 128 may be located remotely from the other modules. For example, the eye gaze determination module 124 may reside in the processors 114, 118 described above. The description of the functionality provided by the different modules 122, 124, 126, and/or 128 described below is for illustrative purposes, and is not intended to be limiting, as any of the modules 122, 124, 126, and/or 128 may provide more or less functionality than is described. For example, one or more of the modules 122, 124, 126, and/or 128 may be eliminated, and some or all of its functionality may be provided by other ones of the modules 122, 124, 126, and/or 128. As another example, the processor 120 may be configured to execute one or more additional modules that may perform some or all of the functionality attributed below to one of the modules 122, 124, 126, and/or 128.

The content provision module 122 is configured to control the provision of content to the user of the system 100 via the display 140. If the content includes computer generated images (e.g., in a videogame, virtual world, augmented reality virtual world, simulation, etc.), the content provision module 122 is configured to generate the images and/or views for display to the user through the display 140. If the content includes video and/or still images, the content provision module 122 is configured to access the video and/or still images and to generate views of the video and/or still images for display on the display 140. If the content includes audio content, the content provision module 122 is configured to generate the electronic signals that will drive a speaker, which may be part of the display 140, to output corresponding sounds. The content, or information from which the content is derived, may be obtained by the content provision module 122 from an electronic storage 129, which may be part of the processor 120, as illustrated in FIG. 2, or may be separate from the processor 120.

The eye gaze determination module 124 is configured to determine a direction of the eye gaze of the user based on information from the output signals generated by the detector 110. The information related to direction of the user's eye gaze determined by the eye gaze direction determination module 124 may describe the direction as a vector in an absolute coordinate system, with respect to other objects, and/or in other contexts. Such information may include, without limitation, coordinates and/or angular relationships, such as pitch and yaw angles, as described above.

The haptic effect determination module 126 is configured to determine the haptic effect or sensation to be generated by the haptic output device 130 for the user, based on information received from the detector 110 and any other sensor that is configured to determine the user's intent or volition, as described above. The gaze parameters determined by the eye gaze determination module 124 may be used alone or in conjunction with other inputs such as content events, motion of any portion of the system 100, etc. Determining the haptic effect may include determining one or more parameters that include an amplitude, frequency, duration, etc., of the haptic sensation. The haptic effect is determined by the haptic effect determination module 126 to enhance one or more aspects of the experience provided by the content to the user. For example, the haptic effect may be determined to enhance one or more of the realism of the content, the enjoyability of content, perception of the content by the user, and/or other aspects of the experience provided by the content being conveyed to the user via the display 140.

The haptic output device control module 128 is configured to control the haptic output device 130 to generate the haptic effect determined by haptic effect determination module 126. This includes communicating the haptic output signal to be generated by the processor 120 and communicated the haptic output device 130. The haptic effect to be generated may be communicated over wired communication links, wireless communication links, and/or other communication links between the processor 120 and the haptic output device 130. In an embodiment, at least a portion of the functionality attributed to the haptic output device control module 128 may be disposed in a processor carried by the haptic output device 130.

The haptic effects or sensations can be created with any of the methods of creating haptics, such as vibration, deformation, kinesthetic sensations, electrostatic or ultrasonic friction, etc. In an embodiment, the haptic output device 130 may include an actuator, for example, an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric materials, electro-active polymers or shape memory alloys, a macro-composite fiber actuator, an electro-static actuator, an electro-tactile actuator, and/or another type of actuator that provides a physical feedback such as a haptic (e.g., vibrotactile) feedback. The haptic output device 130 may include non-mechanical or non-vibratory devices such as those that use electrostatic friction (ESF), ultrasonic surface friction (USF), or those that induce acoustic radiation pressure with an ultrasonic haptic transducer, or those that use a haptic substrate and a flexible or deformable surface, or those that provide projected haptic output such as a puff of air using an air jet, and so on. In an embodiment, multiple haptic output devices may be used to generate different haptic effects. The haptic output device 130 may be located in a gamepad, a mobile phone, a wearable device, or any other device that may be used to create the haptic effects or sensations to the user.

FIG. 3 illustrates a system 300 in accordance with embodiments of the invention. As illustrated, the system 300 includes a camera based gaming system 302, such as a KINECT® gaming system by Microsoft or a PLAYSTATION® gaming system by Sony that is equipped with a PLAYSTATION EYE® camera. In the illustrated embodiment, the gaming system 302 includes the detector 110, which may include the detector 110' and/or the detector 110" described above, and the processor 120 describe above. The system 300 also includes a user input device 304, such as a gamepad, configured to receive an input from a user to provide a command to the gaming system 302. The user input device 304 may also include the haptic output device 130 described above. The system 300 also includes the display 140, such as a television or monitor, configured to display images output by the content provision module 122 of the gaming system 302.

As illustrated in FIG. 3, the user input device 304 is in communication with the gaming system 302 though a wired or wireless communication channel 350 established between a communication port 306 of the gaming system 302 and a communication port 308 of the user input device 304. The haptic output device 130 is configured to receive the signal from the processor 120, such as from the haptic output device control module 128, and output a haptic effect to the user through the user input device 304. The haptic sensation the user feels may depend on the location of the display 140 the user is currently looking at. For example, the user may be looking at the current scene on the display 140, which is not necessarily where the current gamepad focus is located.

For example, if a user is playing a first person shooter game and enters a new room, the user uses his/her eye gaze to quickly look around the scene on the display 140. When the user's eye gaze, represented by EG1, falls on a first portion of the room on the left side of the display 140, represented by area "A", a first haptic effect or sensation may be felt in the user input device 304 to indicate the presence of an object that can be interacted with. When the user's eye gaze, represented by EG2, falls on a second portion of the room on the right side of the display 140, represented by area "B", which does not contain an object that can be interacted with, the user may feel a second haptic effect or sensation that is different from the first haptic effect of sensation. The second haptic effect may be configured to communicate to the user that the second portion of the room does not contain an object that can be interacted with, so that the user does not need to continue to look at the second portion of the room.

In an embodiment, the user input device 304 may include a gamepad with a touch screen or touch pad input. The user may play a game using the display 140 as a main display and the touch screen on the user input device 304. The detector 110 may detect the eye gaze of the user and determine whether the user is looking at the display 140 or whether the user is looking at the touch screen on the user input device 104. The processor 120 may output a signal to the haptic output device 130 based on the detected direction of the user's eye gaze so that the haptic effect generated by the haptic output device 130 may communicate to the user which screen the user should be looking at. In an embodiment, the haptic effect may communicate to the user that something has occurred on the display or screen that the user is not currently looking at to direct the user to look at the other display or screen.

In an embodiment, the user input device 304 may include a wearable device, such as a GLASS® augmented reality display by Google Inc. In this embodiment, the detected eye gaze may be used to indicate what the user would like to select on an augmented reality visual display. For example, the user may look at a menu item or icon and then verbally say "select" or even blink for selection of the menu item or icon. The haptic output device 130 may output haptic effects as the user's gaze moves across menu elements or icons.

In an embodiment, an augmented reality virtual world provided by the content provision module 122 may be combined with the eye gaze direction information determined by the eye gaze direction determination module 124 to determine that a user is looking at a specific object within the augmented reality virtual world at a certain depth in the visual field. The haptic effect determination module 126 may identify the type of object and determine the type of haptic effect to be output by the haptic output device 130. For example, in an embodiment, a user may play a game in which he/she must find real or virtual objects in an augmented reality type display. The user's eye gaze direction may be determined and if the user is looking at object X, a haptic effect associated with object X, i.e. object X's haptic signature, may be generated on the user input device 304 by the haptic output device 130.

In an embodiment, the display 140 may be part of a personal computer. The detector 110 may track the user's eye gaze as the user navigates the display 140 with his/her eyes to control a pointer location on the display 140 in a similar manner as a user would navigate a display with a mouse. The haptic output device 130 may output a haptic effect as the detector 110 detects that the user is looking at each item on the display 140 or when the user is looking at certain highlighted items on the display 140.

Figure 4:
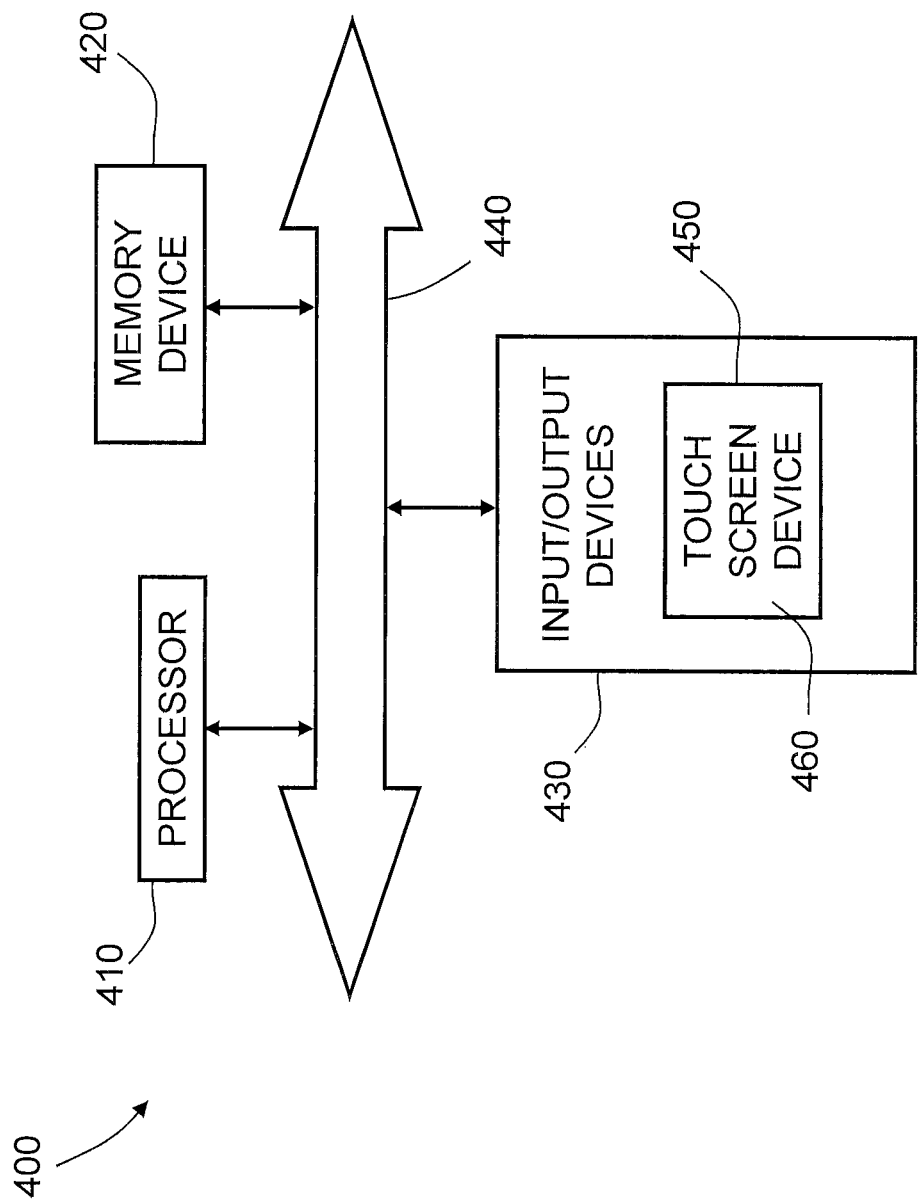
FIG. 4 is a schematic illustration of an electronic device for providing haptic sensations to a user of the device as a function of eye gaze of the user in accordance with an embodiment of the invention.

In an embodiment, the system 100 of FIG. 1 may be part of a single electronic device. FIG. 4 is a schematic illustration of an electronic device 400 in accordance with an embodiment of the invention. As illustrated, the electronic device 400 includes a processor 410, a memory device 420, and input/output devices 430, which are interconnected via a bus 440. In an embodiment, the input/output devices 430 may include a touch screen device 450 or other human-computer interface devices.

The touch screen device 450 may be configured as any suitable human-computer interface or touch/contact surface assembly. The touch screen device 450 may be any touch screen, touch pad, touch sensitive structure, computer monitor, laptop display device, workbook display device, kiosk screen, portable electronic device screen, or other suitable touch sensitive device. The touch screen device 450 may be configured for physical interaction with a user-controlled device, such as a stylus, finger, etc. In some embodiments, the touch screen device 450 may include at least one output device and at least one input device. For example, the touch screen device 450 may include a visual display and a touch sensitive screen superimposed thereon to receive inputs from a user's finger. The visual display may include a high definition display screen.

In various embodiments, the touch screen device 450 is configured to provide haptic feedback to at least a portion of the electronic device 400, which can be conveyed to a user in contact with the electronic device 400. Particularly, the touch screen device 450 can provide haptic feedback to the touch screen itself to impose a haptic effect when the user in is contact with the screen. The haptic effects can be used to enhance the user experience, and particularly can provide a confirmation to the user that the user has made sufficient contact with the screen to be detected by the touch screen device 450.

The electronic device 400 may be any device, such as a desktop computer, laptop computer, electronic workbook, electronic handheld device (such as a mobile phone, gaming device, personal digital assistant ("PDA"), portable e-mail device, portable Internet access device, calculator, etc.), kiosk (such as an automated teller machine, ticking purchasing machine, etc.), printer, point-of-sale device, game controller, or other electronic device.

The processor 410 may be a general-purpose or specific-purpose processor or microcontroller for managing or controlling the operations and functions of the electronic device 400. For example, the processor 410 may be specifically designed as an application-specific integrated circuit ("ASIC") to control output signals to a driver of the input/output devices 430 to provide haptic effects. In an embodiment, the processor 410 includes the processor 120 described above. The processor 410 may be configured to decide, based on predefined factors, what haptic effects are to be generated, the order in which the haptic effects are generated, and the magnitude, frequency, duration, and/or other parameters of the haptic effects. The processor 410 may also be configured to provide streaming commands that can be used to drive a haptic output device for providing a particular haptic effect. In some embodiments, the processing device 410 may actually include a plurality of processors, each configured to perform certain functions within the electronic device 400.

The memory device 420 may include one or more internally fixed storage units, removable storage units, and/or remotely accessible storage units. The various storage units may include any combination of volatile memory and non-volatile memory. The storage units may be configured to store any combination of information, data, instructions, software code, etc. More particularly, the storage devices may include haptic effect profiles, instructions for how the haptic output device of the input/output devices 430 are to be driven, or other information for generating haptic effects.

In addition to the touch screen device 450, the input/output devices 430 may also include specific input mechanisms and output mechanisms. For example, the input mechanisms may include such devices as keyboards, keypads, cursor control devices (e.g., computer mice), or other data entry devices. The input/output devices 450 may include the detector 110, such as the detector 110' that includes the camera 112 and the processor 114 described above. In an embodiment, the user's eye gaze that is detected by the detector 110 may be used to control a pointer location on the touch screen device 450, as described above.

Output mechanisms may include a computer monitor, virtual reality display device, audio output device, printer, or other peripheral devices, such as the gamepad described above with respect the user interface device 304 of FIG. 3. The input/output devices 430 may include mechanisms that are designed to not only receive input from a user, but also provide feedback to the user, such as many examples of touch screen devices.

The touch screen device 450 and other input/out devices 430 may include any suitable combination and configuration of buttons, keypads, cursor control devices, touch screen components, stylus-receptive components, or other data entry components. The touch screen device 450 may also include any suitable combination of computer monitors, display screens, touch screen displays, haptic output devices, such as the haptic output device 130 described above, or other notification devices for providing output to the user.

In an embodiment, the touch screen device 450 includes a display surface 460, which may be rigid, that is configured to modulate its friction properties through, including but not limited to, electrostatic friction and ultra-sonic surface vibration, to give the user a feeling of surface relief (e.g., hills and valleys) when running a finger or stylus across the display that corresponds to the display image.

Figure 5:
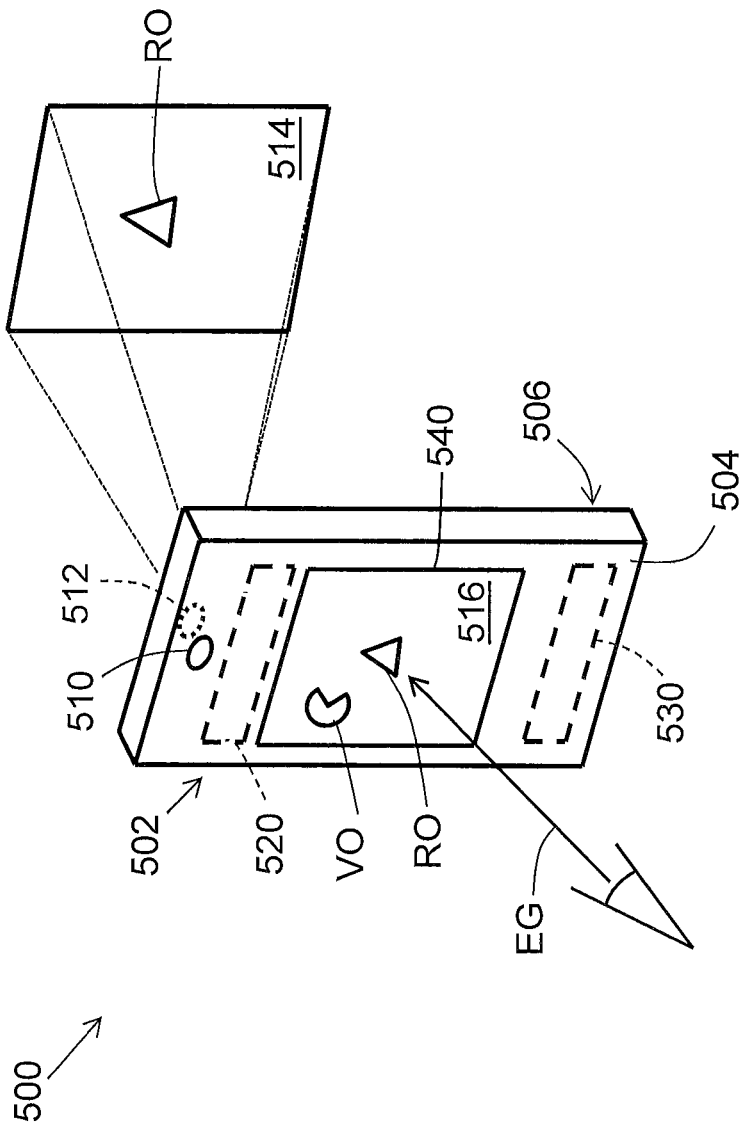
FIG. 5 is a schematic illustration of the electronic device of FIG. 5 in accordance with an embodiment of the invention.

FIG. 5 illustrates an embodiment of an electronic device 500, such as the electronic device 400 described above. As illustrated, the electronic device 500, which may be a mobile phone, includes a housing 502 having a first side 504 and a second side 506, a first camera 510 located on the first side 504 of the housing 502 and configured to face the user during normal operation, and a second camera 512 located on the second side 506 of the housing 502 and configured to face away from the user during normal operation. The first camera 510 may be part of the detector 110' described above and may be configured to track the direction of the user's eye gaze EG. The second camera 512 may be used to capture an image 514 that includes a real physical object RO. The device 500 also includes a display 540 that is supported by the housing 502 and is configured to project an image 516 from the first side 504 of the housing 502. The image 516 displayed by the display may be the image 514 captured by the second camera 512.

As illustrated in FIG. 5, a processor 520 may be located within and supported by the housing 502, and may be an embodiment of the processor 120 described above. The processor 520 may be configured to augment the image 514 captured by the second camera 512 with a virtual object VO so that the image 516 displayed by the display 540 includes representations of the real object RO and the virtual object VO. A haptic output device 530, such as the haptic output device 130 described above, may be located in and/or supported by the housing 502. In an embodiment, a first haptic effect may be generated by the haptic output device 530 if the processor 520 determines that the eye gaze EG of the user is in the direction of the real object RO, and a second haptic effect that is different from the first haptic effect may be generated by the haptic output device 530 if the processor 520 determines that the eye gaze EG of the user is in the direction of the virtual object VO. In an embodiment, the cameras 510, 512 of the device 500 may be used in a similar manner to determine the user's eye gaze for navigation purposes.

Figure 6:
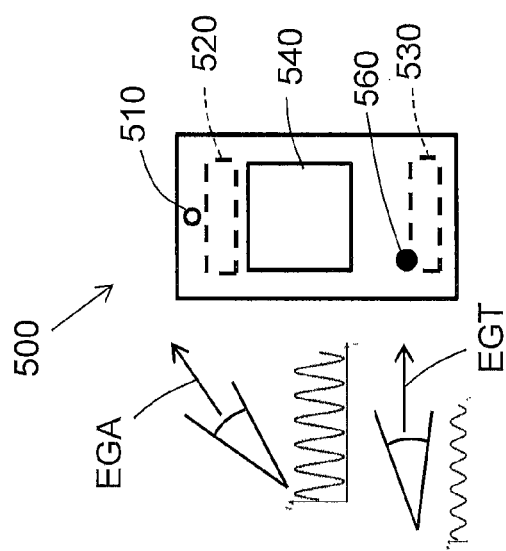
FIG. 6 is a schematic illustration of the electronic device of FIG. 5 in accordance with an embodiment of the invention.

In an embodiment, the haptic effect that is generated by the haptic output device 530 may depend on whether the user's eye gaze is directed towards or away from the display 540 of the device 500, as detected by the camera 510 and determined by the processor 520. For example, in an embodiment, an intensity of the haptic effect associated with contact with a widget or button 560 on the device 500 may be increased by the haptic output device 530 when the processor 520 determines that the eye gaze of the user is directed away from the screen 540, as indicated by EGA in FIG. 6. This may assist the user of the electronic device 500 when trying to operate the widget or button 560 without looking at the device 500. When the processor 520 determines that the eye gaze of the user is directed towards the screen 540, as indicated by EGT in FIG. 6, an intensity of the haptic effect may be decreased, because it is assumed that the user can see the widget or button 560. The amplitudes of the periodic signals in FIG. 6 represent different intensities of haptic effects associated with the two different eye gazes EGA, EGT.

Figure 7A:
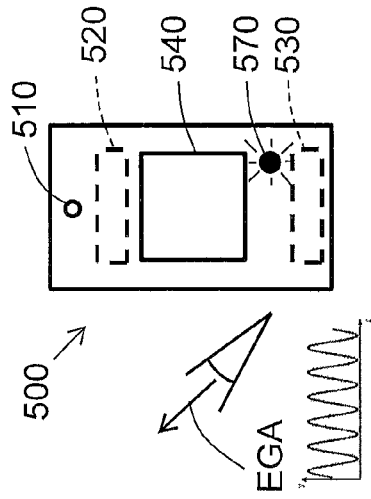
FIGS. 7A and 7B are schematic illustrations of the electronic device of FIG. 5 in accordance with an embodiment of the invention.
Figure 7B:
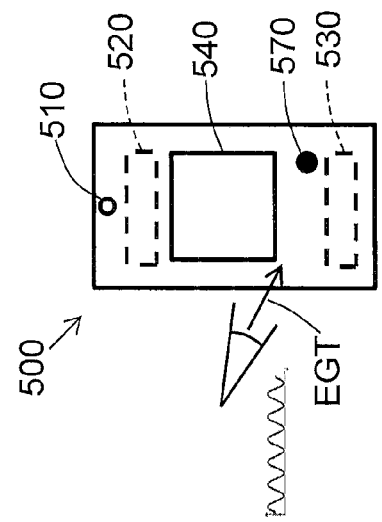

In an embodiment, haptic effects may also be used to attract attention to a notification or other onscreen event, such as the arrival of a new email. Visual attention of the user with respect to the display 540 of the device 500 may be monitored with the camera 510 and the processor 520 may determine whether a haptic notification in the form of a haptic sensation generated by the haptic output device 530 is necessary or whether the user has looked at the display 540 to review the notification of other onscreen event. For example, as illustrated in FIG. 7A, if it is determined that the user has an eye gaze EGA away from the display 540, a haptic effect may be generated by the haptic output device 530 to notify the user that a new email has been received. The haptic effect may initially be very strong, as indicated in FIG. 7A, but may gradually decrease in intensity and fade away once the camera 510 and the processor 520 determine that the user is known to have looked at a notification icon 570 or the display 540 by the detection of the eye gaze EGT towards the notification icon 570 or the display 540, as illustrated in FIG. 7B, since the visual feedback is sufficient to provide the notification.

Figure 8:
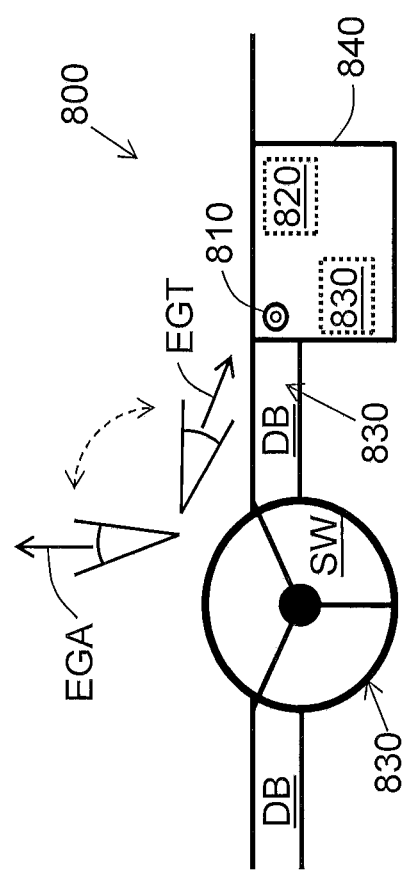
FIG. 8 is a schematic illustration of the system of FIG. 1 illustrates in accordance with an embodiment of the invention.

FIG. 8 illustrates an embodiment in which an electronic device 800 is provided in the form of a vehicle's onboard computer. The device 800 may include a detector, such as the detector 110' described above, that includes a camera 810 and a processor 820, such as the processor 120 described above. In this embodiment, the camera 810 and the processor 820 are also configured to monitor the number of glances the user makes to a display 840 of the device 800 during a predetermined amount of time. The haptic effects provided by a haptic output device 830, such as the haptic output device 130 discussed above, may be tuned to reduce the number of glances the user makes to the display 840. The haptic output device 830 may be located at the display 840, if the display 840 includes a touch screen, and/or at another location within the vehicle that the driver contacts, such as a steering wheel, SW, or a surface of the dashboard DB, or the seat on which the driver sits. In an embodiment, if it is determined that the user is glancing at the display 840, for example, more than ten times during a minute, an intensity of the haptic effect provided by the haptic output device 830 may be increased, based on the assumption that the user is needing to rely on visual confirmation because the haptic feedback being provided by the device 800 is not strong enough to provide a satisfactory confirmation. Similarly, if it is determined that the user is glancing at the display 840, for example, less than two times per minute, the intensity of the haptic effect may be decreased.

FIG. 9 illustrates a method 900 in accordance with embodiments of the invention described herein. As illustrated, the method starts at 902. As 904, a direction of an eye gaze of a user of a device or a system is determined. At 906, a haptic effect is generated based on the direction of the eye gaze. At 908, the haptic effect is output to the user. The method ends at 912.

The illustrated and above-described embodiments are not considered to be limiting in any way, and embodiments of the present invention and may be used to enable haptic feedback in various electronic devices, such as touch screen handheld devices (mobile devices, PDA, and navigation systems), automotive applications, gaming consoles, etc.

Although many of the examples described herein relate to touch screen devices, it should be understood that the present disclosure also encompasses other types of human-computer interfaces involving touch sensitive structures. In addition, other features and advantages will be apparent to one of ordinary skill in the art upon reading and understanding the general principles of the present disclosure. These other features and advantages are intended to be included in the present disclosure as well.

The embodiments described herein represent a number of possible implementations and examples and are not intended to necessarily limit the present disclosure to any specific embodiments. Instead, various modifications can be made to these embodiments as would be understood by one of ordinary skill in the art. Any such modifications are intended to be included within the spirit and scope of the present disclosure and protected by the following claims.

What is claimed is:

1. A system comprising:
a detector configured to determine a direction of an eye gaze of a user of the system relative to an object on a display device associated with the system;
a processor configured to determine one or more parameters of a first haptic effect and a second haptic effect, different from the first haptic effect, for the user based on the direction of the eye gaze relative to the object on the display device, generate a first haptic output signal representative of the first haptic effect when the eye gaze of the user is determined to be directed at the object on the display device, and generate a second haptic output signal representative of the second haptic effect when the eye gaze of the user is determined to not be directed at the object on the display device and directed at another object on the display device that is different from the object, wherein the object is a real object and the other object is a virtual object displayed on the display device and wherein the one or more parameters selected from the group consisting of an amplitude, a frequency, and duration of the haptic effect; and
a haptic output device configured to receive the first haptic output signal and the second haptic output signal from the processor and output the first haptic effect or the second haptic effect to the user based on the direction of the eye gaze of the user relative to the object on the display device.

2. The system according to claim 1, wherein the haptic output device comprises an actuator configured to output the haptic effect.

3. The system according to claim 1, wherein the haptic output device comprises a non-mechanical device configured to output the haptic effect.

4. The system according to claim 1, wherein the detector comprises a camera configured to capture an image of an eye of the user, and an image processor configured to determine the direction of the eye gaze based on the image.

5. The system according to claim 1, wherein the detector comprises a sensor configured to monitor movements of muscles near an eye of the user, and a second processor configured to determine the direction of the eye gaze based on the monitored movements.

6. The system according to claim 1, wherein the detector and the processor are part of a first device and the haptic output device is part of a second device that is separate from the first device.

7. The system according to claim 6, further comprising a communication port configured to establish a wired or wireless communication channel between the first device and the second device.

8. The system according to claim 1, wherein the detector is part of a first device and the processor and the haptic output device are part of a second device that is separate from the first device.

9. The system according to claim 8, further comprising a communication port configured to establish a wired or wireless communication channel between the first device and the second device.

10. The system according to claim 1, wherein the processor is further configured to generate an augmented reality space on the display device, and use the direction of the eye gaze to determine when the object the user is looking at is an object in the augmented reality space.

11. A method for providing a haptic effect to a user of a system, the method comprising:
    determining a direction of an eye gaze of the user of the system relative to an object on a display device with a detector;
    determining one or more parameters of a first haptic effect and a second haptic effect, different from the first haptic effect, for the user based on the direction of the eye gaze relative to the object on the display device with a processor, the one or more parameters selected from the group consisting of an amplitude, a frequency, and duration of the haptic effect;
    generating a first haptic output signal representative of the first haptic effect when the eye gaze of the user is determined to be directed at the object on the display device, generating a second haptic output signal representative of the second haptic effect when the eye gaze of the user is determined to not be directed at the object on the display device and directed at another object on the display device that is different from the object, wherein the object is a real object and the other object is a virtual object displayed on the display device; and
    outputting the first haptic effect to the user with a haptic output device based on the first haptic output signal or the second haptic effect to the user with the haptic output device based on the second haptic output signal based on the direction of the eye gaze of the user relative to the object on the display device.

12. The method according to claim 11, wherein said determining comprising capturing an image of an eye of the user with the detector, and determining the direction of the eye gaze based on the image with the processor.

13. The method according to claim 11, wherein said determining comprises monitoring movements of muscles near an eye of the user with the detector, and determining the direction of the eye gaze based on the monitored movements with the processor.

14. The method according to claim 11, wherein said second haptic effect is generated when the eye gaze of the user is determined to be directed at another object on the display device that is different from the object.

15. An electronic device comprising:
    a housing;
    a detector supported by the housing, the detector configured to determine a direction of an eye gaze of a user of the electronic device relative to an object on a display device associated with the electronic device;
    a haptic output device supported by the housing, the haptic output device configured to generate a haptic effect to the user; and
    a processor supported by the housing, the processor configured to generate:
    i) a first haptic drive signal representative of a first haptic effect based on the eye gaze of the user corresponding to the user looking at the object on the display device associated with the electronic device, and
    ii) a second haptic drive signal representative of a second haptic effect based on the eye gaze of the user corresponding to the user looking away from the object on the display device associated with the electronic device and at another object on the display device that is different from the object, wherein the object is a real object and the other object is a virtual object displayed on the display device, the second haptic effect having one or more parameters different from the first haptic effect, the one or more parameters selected from the group consisting of an amplitude, a frequency, and duration of the haptic effect, the processor further being configured to output the first haptic drive signal or the second haptic drive signal to the haptic output device to generate the haptic effect based on the direction of the eye gaze relative to the object on the display device associated with the electronic device determined by the detector.

16. The electronic device according to claim 15, wherein the detector comprises a camera configured to capture an image of an eye of the user, and an image processor configured to determine the direction of the eye gaze based on the image.

17. The electronic device according to claim 15, wherein the display device is supported by the housing and the display device is configured to display images.

18. The electronic device according to claim 17, wherein the display device includes a touch screen configured to receive input from the user.

19. The electronic device according to claim 15, wherein an intensity of the second haptic effect is greater than an intensity of the first haptic effect.

20. The electronic device according to claim 15, wherein the electronic device is a mobile phone.

21. The system according to claim 1, wherein the system is a gaming system.

22. The system according to claim 1, wherein the system is part of a vehicle.

23. The method according to claim 11, further comprising:
    generating an augmented reality space that includes the object;
    displaying the augmented reality space on the display device; and
    generating the first haptic output signal when the eye gaze of the user is determined to be directed at the object in the augmented reality space.

24. The system according to claim 1, wherein the direction of the eye gaze of the user is usable for providing a command to the processor and the processor is further configured to:
    determine one or more parameters of a third haptic effect based on the command; and
    generate a third haptic output signal representative of the third haptic effect, wherein the haptic output device is further configured to receive the third haptic output signal and output the third haptic effect to the user.

25. The method according to claim 11, further comprising:
    determining a user command based on the direction of the eye gaze of the user;
    determining one or more parameters of a third haptic effect based on the user command;
    generating a third haptic output signal representative of the third haptic effect; and
    outputting the third haptic effect to the user with the haptic output device based at least in part on the third haptic output signal and the user command.

\* \* \* \* \*

UNITED STATES PATENT AND TRADEMARK OFFICE
CERTIFICATE OF CORRECTION

PATENT NO. : 9,833,697 B2
APPLICATION NO. : 13/793966
DATED : December 5, 2017
INVENTOR(S) : Danny A. Grant et al.

It is certified that error appears in the above-identified patent and that said Letters Patent is hereby corrected as shown below:

In the Claims

In Claim 1, Column 10, Line 41, please insert -- a -- after the word "and" and before the word "duration"

In Claim 1, Column 10, Line 41, please delete "of the haptic"

In Claim 1, Column 10, Line 42, please delete "effect"

In Claim 2, Column 10, Line 51, please insert -- first -- before the word "haptic"

In Claim 2, Column 10, Line 51, please insert -- or the second haptic effect -- after the word "effect" and before the "."

In Claim 3, Column 10, Line 54, please insert -- first -- after the word "the" and before the word "haptic"

In Claim 3, Column 10, Line 54, please insert -- or the second haptic effect -- after the word "effect" and before the "."

In Claim 11, Column 11, Line 30, please insert -- a -- before the word "duration"

In Claim 11, Column 11, Line 30, please delete "of the haptic effect"

In Claim 15, Column 12, Line 22, please insert -- a -- before the word "duration"

In Claim 15, Column 12, Line 22, please delete "of the haptic effect"

In Claim 15, Column 12, Line 25, please insert -- first -- after the word "the" and before the word "haptic"

Signed and Sealed this
Twenty-fifth Day of June, 2019

Andrei Iancu
*Director of the United States Patent and Trademark Office*

In Claim 15, Column 12, Line 25, please insert -- or the second haptic effect -- after the word "effect" and before the word "based"